US008628743B2

(12) United States Patent
Hosseini Jenab et al.

(10) Patent No.: US 8,628,743 B2
(45) Date of Patent: Jan. 14, 2014

(54) REDOX GAS SWEETENING SOLUTIONS

(75) Inventors: Masih Hosseini Jenab, Tehran (IR); Jaber Neshati, Tehran (IR); Khaled Forsat, Tehran (IR)

(73) Assignee: Research Institute of Petroleum Industry (RIPI), Tehran (IR)

( * ) Notice: Subject to any disclaimer, the term of this patent is extended or adjusted under 35 U.S.C. 154(b) by 615 days.

(21) Appl. No.: 12/405,437

(22) Filed: Mar. 17, 2009

(65) Prior Publication Data

US 2009/0246106 A1 Oct. 1, 2009

(30) Foreign Application Priority Data

Mar. 17, 2008 (EP) .................................... 08152857

(51) Int. Cl.
*B01D 53/52* (2006.01)
*B01D 53/48* (2006.01)
*B01D 53/40* (2006.01)

(52) U.S. Cl.
USPC ........... 423/220; 423/226; 423/228; 423/385; 423/397; 423/576.4

(58) Field of Classification Search
USPC ........... 423/576.4, 576.6, 220, 222, 226, 228, 423/385, 397; 208/236–238, 249
See application file for complete search history.

(56) References Cited

U.S. PATENT DOCUMENTS

| | | | |
|---|---|---|---|
| 4,009,251 A * | 2/1977 | Meuly | 423/576.6 |
| 4,323,544 A | 4/1982 | Magder | |
| 4,356,155 A | 10/1982 | Blytas et al. | |
| 4,515,759 A | 5/1985 | Burnes et al. | |
| 4,515,764 A | 5/1985 | Diaz | |
| 4,880,609 A | 11/1989 | Naraghi | |
| 4,909,945 A | 3/1990 | Delaney | |
| 5,004,588 A * | 4/1991 | Nisula et al. | 423/226 |
| 5,096,691 A | 3/1992 | Bedell | |
| 5,616,306 A | 4/1997 | Mazgarov et al. | |

FOREIGN PATENT DOCUMENTS

| | | |
|---|---|---|
| EP | 0242938 | 10/1987 |
| EP | 0534774 | 3/1993 |
| EP | 1656992 | 11/2004 |
| GB | 1501200 | 2/1978 |

* cited by examiner

*Primary Examiner* — Stanley Silverman
*Assistant Examiner* — Diana J Liao
(74) *Attorney, Agent, or Firm* — Behavesh & Richmond, PLLC

(57) ABSTRACT

Gas sweetening solutions are described that are capable of removing hydrogen sulfide from gas streams. These gas sweetening solutions increase the size of produced sulfur particles and thereby improve efficiency of their separation, while simultaneously reducing corrosive effects of the sweetening solutions.

The gas sweetening solutions comprise at least one chelating agent, cationic iron and a mixture of nitrite salt and phosphate species.

22 Claims, No Drawings

REDOX GAS SWEETENING SOLUTIONS

CROSS REFERENCE

The present application claims the benefit of EP 08152857.2 filed on Mar. 17, 2008, which is incorporated herein by reference in its entirety.

OBJECT OF THE INVENTION

The object of the present invention is to provide gas sweetening solutions.

BACKGROUND OF THE INVENTION

Natural gas is typically considered "sour" if the hydrogen sulfide content exceeds 5.7 milligrams of $H_2S$ per cubic meter of natural gas. The process for removing hydrogen sulfide from sour gas is called gas "sweetening."

The drawbacks of presence of $H_2S$ in gas streams are well known. These drawbacks are the toxicity of hydrogen sulfide to humans and animals on the one hand and their high corrosive effects, which damage the process apparatus, on the other hand. The $H_2S$ concentration in gas streams should therefore not exceed 4 ppm.

Due to its toxicity, hydrogen sulfide gas cannot be vented into the atmosphere, neither can it be burnt; its combustion produces another highly poisonous and corrosive species, namely $SO_2$. Thus, it is preferred that hydrogen sulfide is eliminated from the gas streams by other chemical means.

Different processes are known to achieve this aim. According to one of these processes, aqueous solutions of metal chelates, especially of iron(II) chelates, are used. The solutions of iron(II) chelates must have an alkaline pH-value. During the sweetening process, $H_2S$ reacts with the iron(II) in the chelate which is subsequently reduced to iron(II) and $H_2S$ is directly converted to elemental sulfur. This process is usually carried out in an absorption tower. In order to regenerate the iron(II) species, the mixture is then contacted with oxygen containing gases (such as air) in a regeneration tower, so that the solution can be recycled.

Common chelating agents used to prepare the mentioned iron chelates include ethylenediaminetetraacetic acid (EDTA), nitrilotriacetic acid (NTA) and hydroxyethyl ethylenediaminetriacetic acid (HEDTA). All of these chelating agents are usually present as sodium salts. The product of the reaction of hydrogen sulfide with these solutions comprising iron(III) chelates is solid sulfur. If the solid sulfur particles are too small, they are difficult to be separated from the solution, which will lead to plugging of pipes and pumps. This will also increase the production of unwanted sulfur species like $SO_x$, thereby reducing the overall sulfur removal efficiency and, unfortunately, also increasing the amount of poisonous waste.

The presence of chelating agents such as EDTA, especially when not in complex with iron, will significantly increase the corrosive activity of the sweetening solution towards the alloys of the sweetening system. This is especially true for sweetening systems that are at least in part made of carbon steel.

In the past, many efforts have been made in order to overcome the problems of the very high corrosion rates of redox solutions on carbon steel alloys, on the one hand, and sulfur particles that are too small to sediment efficiently, on the other hand. These small suspended particles block the pumps and tubes, thereby reducing the circulation rate of the catalyst and hence decreasing the overall process efficiency. This effect further leads to the formation of sulfate and thiosulfate species that are produced due to the inevitable contact of the particles with oxygen in the air.

There are many sweetening solutions disclosed in the prior art that are also based on iron ions complexed by chelating agents like ethylenediaminetetraacetic acid (see for example European patent application 1 656 992). The sweetening solutions known from the art suffer the drawback of high corrosion effects towards the tubes and pumps of the sweetening system and lead to very small sulfur particles that are difficult to separate from the stream.

U.S. Pat. No. 4,515,764 discusses problems of small sulfur particles. The drawback of the sweetening solution described in this document is the thiosulfate present in the composition, leading to very high corrosion rates.

Document U.S. Pat. No. 4,356,155 discloses a process, in which a solution of nitrilotriacetic acid chelates is used for the complexion of the iron. The solution further contains alcohols of the general formula $C_nH_{2n-1}OH$, wherein n=4 to 22. This composition addresses the problem of small sulfur particles, while the high corrosion rates are not addressed. The same applies to document U.S. Pat. No. 4,909,945, wherein polymeric coagulants are used to increase the particle size of the produced sulfur. This effect is achieved by sequentially injecting the coagulant to the process solution. Again the drawback of this process is the high corrosive activity of the solution.

The drawback of high corrosive activity is addressed by document U.S. Pat. No. 5,616,306, wherein high contents of phosphate are applied in a hydrogen sulfide removal process. This process suffers the disadvantage of leading to only a small decrease in corrosion rate, while not having any influence on the sulfur particle size.

It can easily be seen from the state of the art that there is a strong need for gas sweetening solutions capable of producing large sulfur particles and simultaneously reducing the corrosive activity of the solution significantly.

SUMMARY OF THE INVENTION

In one embodiment, the present invention provides a gas sweetening solution comprising at least one nitrite salt. Preferably the nitrite salt is water soluble. The gas sweetening solution can further comprise one or more water soluble compound, selected from the group consisting of at least one of phosphates, polyphosphates, hydrogen phosphates, dihydrogen phosphates, and combinations thereof. The concentration of the phosphate species in the final solution is preferably from 1.0 to 50 g/l or 2.0 to 20 g/l or 10 g/l. The gas sweetening solution can further comprise can comprising cationic iron. The cationic iron can be present as a sulfate, sulfite, nitrite, nitrate or chloride. The gas sweetening solution can further comprise a chelating agent, preferably in the concentration of the nitrite ion in the final solution is from 0.05 to 20 g/l, or 0.5 to 10 g/l, or 0.75 to 1.0 g/l, or 0.5 to 200 g/l. The gas sweetening solution can comprise water as solvent, with or without another solvent. In one embodiment, the gas sweetening solution according to claim 1, further comprising a water miscible alcohol as solvent.

In one embodiment, the present invention provides a gas sweetening solution comprising:
  a. a water soluble iron(III)-salt;
  b. $Na_2H_2EDTA$;
  c. $Na_4EDTA$;
  d. one or more carbohydrate stabilizer(s);
  e. one or more water soluble nitrite salt; and
  f. one or more phosphate species;

In one embodiment, the present invention provides a process for reducing the $H_2S$ content of a gas comprising contacting the solution recited above with the gas. In one embodiment the process results in a sulfur particles with an average diameter of more than 2 μm and a corrosion rate of less than 100 mpy. In one embodiment, the corrosion rate is 1 to 10 mpy. In one embodiment, the average sulfur diameter is 3 to 10 μm.

DETAILED DESCRIPTION OF THE INVENTION

The present invention refers to gas sweetening solutions capable of increasing the size of produced sulfur particles and hence improving the efficiency of their separation, while simultaneously reducing the corrosive effects of the sweetening solutions.

The advantageous sweetening solutions according to the present invention comprise nitrite and preferably a mixture of nitrite and a phosphate species.

The gas sweetening solutions according to the present invention can be used in the purification of natural gas, tail gas and other hydrogen sulfide containing gases. The hydrogen sulfide content of the gas typically exceeds about 5.7 milligrams of $H_2S$ per cubic meter of natural gas.

Furthermore the present invention refers to the use of nitrite in sweetening solutions and to the use of a mixture of nitrite and phosphate species in sweetening solutions.

Also, the present invention refers to a process of sweetening hydrogen containing gases by applying a sweetening solution according to the present invention to said gases.

The sweetening solutions set out in the claims overcome the above-described drawbacks by adding soluble nitrite to the sweetening solutions.

The invention refers to a gas sweetening solution, comprising at least one nitrite salt.

In particular the sweetening solutions according to the invention comprise:
a. a chelating agent,
b. cationic iron,
c. a mixture of nitrite and a phosphate species
wherein the molar ratio of nitrate to chelated iron is 0.001 to 2.0.

In the gas sweetening solution according to the invention iron(II) can be present in amounts of from 100 ppm to 40,000 ppm.

Furthermore, the solution may comprise a water soluble iron(III) salt, the chelating agent is a mixture of $Na_2H_2EDTA$ and $Na_4EDTA$ and the solution also comprises a carbohydrate stabilizer.

The cationic iron can be present as a sulfate, sulfite, nitrite, nitrate or chloride.

Preferably the pH of the solution is in the range of from 7 to 12.

The sweetening solution may comprise a stabilizer selected from the group of carbohydrates and multifunctional alcohols in amounts of from 0.001 to 0.5 mol/l.

The gas sweetening solution according to the invention may have a concentration of the nitrite ion in the final solution from 0.05 to 20 g/l, preferably from 0.5 to 10 g/l and most preferably from 0.75 to 1.0 g/l.

A suited concentration of the phosphate species in the final solution is from 0.5 to 200 g/l, preferably from 1.0 to 50 g/l, more preferably 2.0 to 20 g/l and most preferably 10 g/l.

The gas sweetening solution may comprise water as solvent, preferably in the absence of further solvents. But water miscible alcohols are suited as solvent. Examples of water soluble alcohols include methanol, ethanol, n-propanol, and isopropanol.

Preferred embodiments of the sweetening solutions according to the present invention also comprise phosphate, polyphosphate, hydrogen or dihydrogen phosphate salts. The phosphates, polyphosphate, hydrogen or dihydrogen phosphate salts are hereinafter referred to as phosphate species.

The solution described herein can be used in every kind of $H_2S$ removing composition that is suffering the same problems or is based upon the same mechanism as described above. The scope of the present invention is not limited to the examples given below.

In a preferred embodiment of the present invention the final concentration of nitrite ion is from 0.05 to 20 g/l, preferably from 0.5 to 10 g/l and most preferably from 0.75 to 1.0 g/l.

In another preferred embodiment of the present invention the final concentration of the phosphate species calculated as ions of phosphate species in the final sweetening solution is from 0.5 to 200 g/l, preferably from 1.0 to 50 g/l, more preferably 2.0 to 20 g/l and most preferably 10 g/l.

Another preferred embodiment of the present invention comprises a water soluble iron(II) salt, a mixture of $Na_2H_2EDTA$ and $Na_4EDTA$ as well as a carbohydrate stabilizer.

The pH of a preferred formulation is in the range of from 7 to 12, preferably from 8 to 10 and most preferably the pH is 9. Reducing the pH will lead to an increase in corrosion rate, while increasing the pH leads to the formation of useless by-products in the solution.

The iron salt used in the catalytic solution of the present invention can be iron(III) sulfate, sulfite, nitrite, nitrate or chloride. Of course, if iron(III) nitrite is added, the amount of nitrite salt present in the sweetening solution is reduced accordingly. The most preferred iron(III) salt is iron(III) sulfate.

The phosphate species to be used in the solution according to the present invention is selected from phosphate, polyphosphate, hydrogen or dihydrogen phosphate, while the most preferred phosphate species is phosphate.

In a preferred embodiment of the present invention, a stabilizer is present in the composition. The preferred stabilizer of the present invention is a multifunctional alcohol or carbohydrate. The most preferred stabilizer is sorbitol.

In a preferred embodiment of the present invention, the stabilizer is present in an amount of from 0.001 to 0.5 mol/l, more preferred from 0.004 to 0.2 mol/l and most preferred in an amount of 0.009 mol/l.

In a preferred embodiment of the present invention the molar ratio of nitrite to chelated iron is from 0.001 to 2.0, preferably from 0.5 to 1.5 and most preferably 0.8.

In a preferred embodiment of the present invention the molar ratio of phosphate to chelated iron is from 1.0 to 4.0, preferably from 2.0 to 3.0 and most preferably the molar ratio is 2.6.

The catalyst solution is prepared to comprise iron(III) in concentrations of about 100 ppm to 40,000 ppm, preferably 500 ppm to 20,000 ppm, more preferably 1,000 ppm to 5,000 ppm and most preferably the concentration is 2,000 ppm.

Preferably the average sulfur diameter is more than 2 μm, more preferably more than 3 μm. In one embodiment, the average sulfur diameter is 3 to 10 μm.

Preferably the corrosion rate is less than 100 mpy, or less than 50 mpy, or less than 20 mpy, or less than 10 mpy. In one embodiment, the corrosion rate is 1 to 10 mpy.

According to preferred embodiments, the sweetening solutions according to the present invention are free of an organic bases, preferably free of an organic alkaline bases such as carbonates, hydroxides etc. of for example sodium or potassium.

Within the process according to the present invention, the chelating agent is added to adjust the pH-value.

The nitrite salt can be nitrites of the alkali and alkaline earth metals. In one embodiment, the nitrite salt is sodium nitrite.

Analytical Methods

The analytical methods described below are known to the skilled person. The parameters used for evaluation of the present invention are given below.

Polarization Curve

An Potentiostat/Galvanostat Model 273A EG&G together with M352 software were used to perform the corrosion studies.

Coupons and electrodes were cut from a tube of carbon steel having a chemical composition (% by weight) of Fe=98.7; C=0.22; Si=0.273; Mn=0.553; P<0.005; S<0.005, Cr=0.0564; Mo=0.0142; Ni=0.0560; Co<0.02; Cu=0.0639; Nb=0.0144; Ti<0.005; V<0.005; W<0.04; Pb<0.01; Zn<0.003. The tested specimens were 0.56 cm$^2$ and 36 cm$^2$ in laboratory and pilot test, respectively. The surfaces of the specimens were polished with emery paper (grit: 800), cleaned in distilled water and degreased in acetone.

The base electrolyte was the respective catalytic solution according to the invention at a pH of 8. All of the solutions were prepared from analytical grade reagents and distilled water, with the tests carried out at temperatures of 40±5° C. A standard electrochemical cell with three electrodes was used for the measurements of potentiodynamic polarization. A specimen of carbon steel was used as the working electrode (WE), and a pair of graphite rods as the counter electrode (CE). A saturated calomel reference electrode (SCE) was brought into close proximity with WE by a lugging capillary. The test solution was aerated or de-aerated with $CO_2$ (80%)/$H_2S$ (20%) for corrosion tests. The potentiodynamic polarization measurements were performed by the Potentiostat/Galvanostat model 273A EG&G. The potentiodynamic polarization tests were made at a scan rate of 1 mV·S$^{-1}$ in the applied range of ±300 vs OCP. The electrochemical tests were carried out in stagnant conditions.

Mass Loss Method

Also, the mass loss method was used to determine the average corrosion rate based on ASTM G1 standard, through the equation below:

Corrosion rate (mpy)=3.45×10$^6$×$W/A \times T \times D$

Where mpy means inch/1000 per year, W is the loss of weight through the experiment, A is the surface in cm$^2$, T is the immersion time in hour, D is the alloy density in g/cm3. D is 7.86 g/cm$^3$ for carbon steel.

DEFINITIONS

"Phosphate species" in the context of the present invention means any phosphate, polyphosphate, hydrogen or dihydrogen phosphate, as mentioned before.

The unit "mpy" means mils per year, equivalent to thousands of an inch per year, and reflects the extent of corrosion caused by the sweetening solution.

The term "free of substance X" or "in the absence of X" means that X is not purposefully added to the composition, i.e. is present in amounts that would not significantly alter the properties of the composition.

EXAMPLE 1

Comparative Example 3000 ml of deionized water was poured in a 5 liter beaker together with 0.357 moles of $Fe_2(SO_4)_3$ 5H$_2$O., 0.54 mol of Na$_4$EDTA and Na$_2$H$_2$EDTA plus 0.18 mol of sorbitol were then added to the solution. The pH was thereby adjusted to 9. The solution was afterwards transferred into a 20 liter container and diluted to 20 liters with deionized water. The iron concentration of the resulting solution is 2000 ppm.

This solution was used in a gas purification pilot plant. During the 144-hour test at 45° C. the solution was transferred from the absorption tower to the regeneration tower and vice versa.

A sour gas of 35% $H_2S$ and 65% $CO_2$ passed the absorption tower at a rate of 1 l/min, while the catalyst solution moved at 3 l/min. The rate of air flow was 30 l/min in the regeneration tower. The produced sulfur particles were small and, hence, did not sediment well. The corrosion rate of carbon steel in the sulfur sedimentation tower was studied by both the polarization curves and weight loss methods and was found to be 295 mpy.

EXAMPLE 2

The same solution as that in 1 was prepared by additionally 0.1% NaNO$_2$ and the pH was adjusted at 9. The corrosion rate was found to be 1.5 and the average sulfur particle size change from 1.29 μm in 1 to 1.35 μm.

EXAMPLE 3

Comparative Example

The same solution as that in 1 was prepared by additionally 1% potassium phosphate and the pH was adjusted at 9. The corrosion rate was found to be 95.5 and the average sulfur particle size change from 1.29 μm in 1 to 6.7 μm.

EXAMPLE 4

The same solution as in Example 1 was prepared, 0.5% by weight of potassium phosphate and 0.075% by weight of NaNO$_2$ were added. The pH was again adjusted to 9.

The corrosion rate was found to be 3.6 mpy and the average sulfur particle size changed from 1.29 μm in Example 1 to 4.8 μm.

EXAMPLE 5

The same solution as in Example 1 was prepared, 1.0% by weight of potassium phosphate and 0.075% by weight of NaNO$_2$ were added. The pH was again adjusted to 9.

The corrosion rate was found to be 3.6 mpy and the average sulfur particle size changed from 1.29 μm in Example 1 to 8.5 μm.

EXAMPLE 6

The same solution as in Example 1 was prepared, 0.5% by weight of potassium phosphate and 0.1% by weight of NaNO$_2$ were added. The pH was again adjusted to 9.

The corrosion rate was found to be 1.5 mpy and the average sulfur particle size changed from 1.29 μm in Example 1 to 4.8 μm.

EXAMPLE 7

The same solution as in Example 1 was prepared, 1.0% by weight of potassium phosphate and 0.1% by weight of NaNO$_2$ were added. The pH was again adjusted to 9.

The corrosion rate was found to be 1.5 mpy and the average sulfur particle size changed from 1.29 μm in Example 1 to 13.1 μm.

TABLE 1

The table illustrates the effect of the sweetening solutions according to the present invention on the corrosion rates of catalytic iron chelate solutions and the average diameter of sulfur particles in the sedimentation column.

| solution | phosphate % by weight | nitrite % by weight | average sulfur diameter (μm) | corrosion rate (mpy) |
| --- | --- | --- | --- | --- |
| Example 1 | 0 | 0 | 1.29 | 295 |
| Example 2 | 0 | 0.1 | 1.35 | 1.5 |
| Example 3 | 1 | 0 | 6.7 | 95.5 |
| Example 4 | 0.5 | 0.075 | 4.8 | 8 |
| Example 5 | 1 | 0.075 | 8.5 | 3.6 |
| Example 6 | 0.5 | 0.1 | 4.8 | 1.5 |
| Example 7 | 1 | 0.1 | 13.1 | 0.64 |

It can easily be seen from the examples that the solutions prepared according to the present invention offer enormous advantages over the sweetening solutions of the prior art (see examples 1 and 3, which are comparative examples according to the prior art and show the high and undesired corrosion rates).

What is claimed is:

1. A gas sweetening solution comprising:
   an iron chelate formed by a reaction between a chelating agent and a cationic iron,
   a mixture of at least one nitrite salt and at least one phosphate species, wherein the molar ratio of nitrite to chelated iron is from about 0.001 to about 2.0.

2. The gas sweetening solution according to claim 1, wherein the nitrite salt is water soluble.

3. The gas sweetening solution according to claim 1, wherein the phosphate species is selected from the group consisting of at least one of phosphates, polyphosphates, hydrogen phosphates, dihydrogen phosphates, and combinations thereof.

4. The gas sweetening solution according to claim 1, wherein the cationic iron is a sulfate, sulfite, nitrite, nitrate or chloride.

5. The gas sweetening solution according to claim 1, wherein the concentration of the phosphate species in the final solution is from about 0.5 to about 200 g/l.

6. The gas sweetening solution according to claim 5, wherein the concentration of the phosphate species in the final solution is from about 1.0 to about 50 g/l.

7. The gas sweetening solution according to claim 6, wherein the concentration of the phosphate species in the final solution is about 2.0 to about 20 g/l.

8. The gas sweetening solution according to claim 7, wherein the concentration of the phosphate species in the final solution is about 10 g/l.

9. The gas sweetening solution according to claim 1, comprising water as solvent.

10. The gas sweetening solution according to claim 9, wherein another solvent is not used.

11. The gas sweetening solution according to claim 1, further comprising a water miscible alcohol as solvent.

12. A process for reducing the $H_2S$ content of a gas comprising contacting the solution of claim 1 with the gas.

13. The process of claim 12, wherein the process results in a sulfur particles with an average diameter of more than 2 μm and a corrosion rate of less than 100 mpy.

14. The process of claim 13, wherein the corrosion rate is 1 to 10 mpy.

15. The process of claim 13, wherein the average sulfur diameter is 3 to 10 μm.

16. The gas sweetening solution according to claim 1, wherein the nitrite salt is a nitrite of alkali and alkaline earth metals.

17. The gas sweetening solution according to claim 1, wherein the nitrite salt is sodium nitrite.

18. The gas sweetening solution according to claim 1, wherein the concentration of the nitrite ion in the final solution is from about 0.05 to about 20 g/l.

19. The gas sweetening solution according to claim 1, further comprising a stabilizer selected from the group consisting of carbohydrates and multifunctional alcohols in amounts of from about 0.001 to about 0.5 mol/l.

20. The gas sweetening solution according to claim 1, wherein the cationic iron is a water soluble iron(III)salt, the chelating agent is a mixture of $Na_2H_2EDTA$ and $Na_4EDTA$ and the solution further comprises a carbohydrate stabilizer.

21. The gas sweetening solution according to claim 18, wherein the concentration of the nitrite ion in the final solution is from about 0.5 to about 10 g/l.

22. The gas sweetening solution according to claim 21, wherein the concentration of the nitrite ion in the final solution is from about 0.75 to about 1.0 g/l.

* * * * *